F. HILLE.
Treatment of Sewage.
No. 138,250.　　　　　　　　　　　　　Patented April 29, 1873.
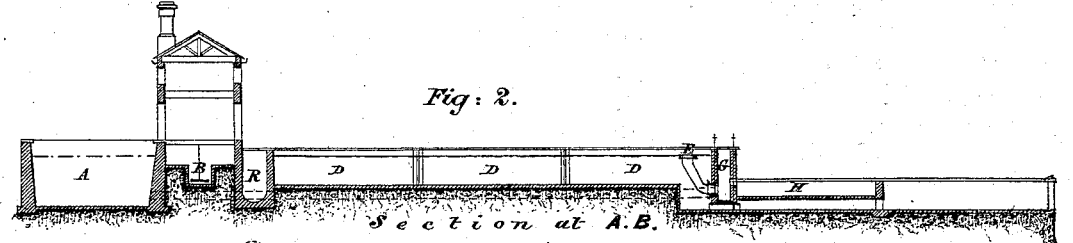
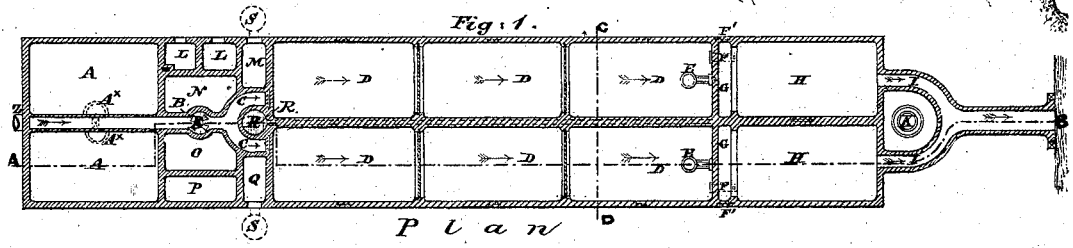

UNITED STATES PATENT OFFICE.

FRITZ HILLÉ, OF FLORA VILLA, BRENTFORD, ENGLAND.

IMPROVEMENT IN THE TREATMENT OF SEWAGE.

Specification forming part of Letters Patent No. 138,250, dated April 29, 1873; application filed August 6, 1872.

*To all whom it may concern:*

Be it known that I, FRITZ HILLÉ, of Flora Villa, Brentford, in the county of Middlesex, in the Kingdom of England, a subject of the Emperor of Germany, have invented or described new and useful improvements in the treatment and utilization of sewage, and in the manufacture of manure therefrom; and I, the said FRITZ HILLÉ, do hereby declare the nature of the said invention and in what manner the same is to be performed to be particularly described and ascertained in and by the following statement thereof—that is to say:

This invention has for its object improvements in the treatment and utilization of sewage and in the manufacture of manure therefrom.

On the sheet of drawing hereunto annexed I have shown a system of depositing-tanks and apparatus for treating the sewage of towns arranged according to my invention.

Figure 1 is a plan view, and Fig. 2 a longitudinal section, taken on the line A B in Fig. 1; and Fig. 3 is a tranverse section taken on the line C D in Fig. 1.

Z is the inlet-sewer which leads the sewage to the mixing-chamber. On both sides of this sewer impounding-reservoirs A A are constructed to provide storage-room for any excess of sewage-water during storms or heavy rainfalls, or at night-time. The sewage, entering the works, or about some fifty yards before it enters the works, receives the disinfecting compound in a liquid form, or, as I call it, the disinfecting-milk mixed with the disinfecting compound. The sewage enters into chamber B, in which there is a revolving agitating-wheel driven continuously in any suitable manner, so that the sewage and disinfectant are here most intimately mixed, one with the other. From the mixing-chamber B the mixed sewage and disinfectant flows through either one or the other of the channels C C into the depositing-tanks D D. These depositing-tanks have been peculiarly arranged as follows: They are divided by transverse partitions into three compartments so as to impede and obstruct the flow of the sewage, and allow the almost complete settlement of the solid matters held in suspension. The arrows in the drawing show the flow of the mixed sewage. In the third compartment of the deposit-tanks are provided self-acting floating-outlets through which, at a regulated flow, the purified sewage is led away through sluice-valves to the outlet-chamber G, and thence to the artificial downward filters H H, which are of peculiar construction, acting both as a chemical and a mechanical filtering medium. F F are wash-out pipes passing direct from the reservoirs D to the outfall, and F' F' are irrigation-outlets. The filter-beds are constructed as ordinary filter-beds of waterworks — broken bricks at the bottom, then coarse gravel and fine gravel; then coarse sand and fine sand, and between the top layer of small white stones a layer varying in thickness of the spent charcoal from sugar-refineries mixed with sea-weed or any other vegetable charcoal. This chemical filter—*i. e.*, the layer of mixed charcoal—absorbs all the impure matters, suspended or in solution, which are left in the purified sewage after having undergone the chemical precipitation process. Before the purified sewage is allowed to flow onto the filters, carbonic-acid gas is forced in to it in the outlet-chamber at all such sewage-works where the lime is burnt on the premises, this carbonic-acid gas being a waste product from the lime-burning process. The addition of this carbonic-acid gas produces an extraordinary purification of the sewage, inasmuch as any excess of lime contained in the purified liquid will at once be precipitated to the bottom as carbonate of lime, thus avoiding the purified water having an alkaline reaction. Where the lime is not burnt on the premises, then, for the purpose of effecting the same amount of purity, a small quantity of perchloride of iron by preference is added to the purified sewage-water. The liquid which has passed through the artificial downward filter is sufficiently pure to be admissible into any river or running stream.

Where the locality permits, or where otherwise convenient, the clear liquid from the depositing-tanks may be used for irrigation purposes, as this clear liquid, after having simply undergone the first half of my process—namely, the precipitation process—still holds sufficient fertilizing ingredients to be useful for such a purpose. By preference, in such a case, I lay out the land, as shown on the sketch, Fig. 4, as I find that if the sewage or partlypurified water is discharged into the irrigating-channels *a a a*, which are about fifty feet apart, the beds B B receive the greatest benefit for agricultural purposes from the fertilizing ingredients contained in the liquid so used for irrigation purposes. This manurial water, introduced sidewise instead of being applied over all the surface, has a greater and more beneficial effect on the roots of the plants, and allows a more regulated application than under any other system of laying out land for irrigation purposes. At the same time this way of laying out the land necessitates no complicated system of under drainage, and will give the land only sufficient moisture, but not an excess of moisture, as is the case where surface or cubical irrigation is resorted to.

At all sewage-works, erected according to my system, I build the above-described artificial filters because the sewage-water passed through these filters will be found always sufficiently pure for admission into a river, and if land for irrigation be at hand as well, then, by my system, the purified water may only be applied to the land for irrigation purposes when the season or the crops require it, and in winter time, or at any other time of the year when the ground does not require irrigation the purified water from the deposit-tanks will flow away from the filters perfectly purified.

Sluices F' F' are provided from the first outlet-chamber to conduct the purified sewage onto the land through proper channels, or the purified sewage from the deposit-tanks, after passing through the first outlet-chamber G, and then after having passed through the artificial filters, may enter a second outlet-chamber, from which it is carried off by self-acting floating outlets, like those shown at E E, fitted with valves, by opening or closing which the speed of filtration can be regulated. I is the channel for conveying the filtered sewage-water. K designates the sand-washing machine used for the cleaning the sand. When the filters are renewed for washing the sand the effluent water may be used. L L are lime-kilns; M, coal-store; N, boiler-room; O, engine-room; P, the drying-room; Q, the sludge-pumps, and R the sludge-well, where the sludge is connected by means of the sewer in the divisional wall between the depositing-tanks. The depositing-tanks being inclined toward the sewer, and being fitted with valves, respectively, sluices provide an easy method of conveying the sludge accumulated in them to the said sewer. Q is the pumping apparatus connected with the pumping-engines for raising the accumulated daily sludge from the sludge-well onto the drying-floor, which, by preference, is so constructed as to use the air as drying medium after, by straining or the use of hydro-extractors, the greatest part of the water contained in the sewage residue has been separated.

Passages not shown in the drawing are arranged along the two outer sides of the systems of deposit-tanks, so that when any of the three compartments may require cleaning, the sewage, instead of passing into such compartment, may be led into the compartment next to it. By this arrangement the system of tanks can never be out of working order.

These deposit-tanks are, as above stated, cleaned daily, and this construction enables me to use the precipitate produced by the addition of the chemical mixture to the sewage a second time for the same purpose, effecting hereby, in the first place, a most considerable saving of the chemicals required for purifying the sewage, and, secondly, enabling me to produce a precipitate much richer in fertilizing ingredients for the manufacture of manure.

The disinfecting compound I prefer to use consists of lime in combination with chloride of zinc and chloride of magnesium; and sometimes I also use refined gas tar, which, in such case, is combined with the lime, as hereinafter described; or, in place of the chloride of zinc, I sometimes use the sulphate of alumina, and mix it with chloride of magnesium, mixing the two in the proportions of about five parts, by weight, of sulphate of alumina with one part of chloride of magnesium. When I use this mixture I also use lime, which is mixed with gas-tar, as hereinafter described, and added in a subsequent tank. I manufacture this compound for use, either in a liquid form or as a dry compound, in casks or cakes, the size of which depends on the quantity of sewage I have to deal with, or on the effect I intend to produce. The solution of disinfectant is allowed to drop or flow into the sewage, and is thoroughly mixed therewith by means of an agitating-wheel. The water employed to dissolve the disinfectant may be the water resulting from the purified sewage. I prefer to use the disinfectant in form of bricks of different size around the inlets to the storing-reservoirs at $A^x$. It is also useful in the form of powder for urinals, closets, and such like, at railway stations, closets in private houses or public buildings, such as military barracks, hospitals, theaters, hotels, and the like; and a considerable advantage may be obtained by the employment of my disinfectant in the holds of ships for transport of cattle or other living freight.

The following is the manner in which it is preferred to manufacture the disinfecting agent: I use the best chalk-lime, slaked with sufficient water to produce a kind of paste, and to the slaked lime such other ingredients as chloride of zinc or salts of magnesia, such as chloride of magnesia may be added as are readily obtained in the locality. This addition, either in a dissolved or undissolved state, should be made at the highest temperature of the lime, so as to produce the greatest possible efficiency of the disinfectant. If tar or carbolic acid be added it has to be done when the slaked lime is at its greatest heat. The quantity of the disinfectant and purifying compound required for complete, effective, and lasting deodorization of sewage or other impure waters depends upon the quantity as well as the quality of such waters, and averages from one-half to three pounds of disinfecting compound for every one thousand pounds of sewage-water to be purified, according to the more or less putrefied state of sewage and its organic contents.

To manufacture the sewage-precipitate into a marketable manure, the sludge resulting from a second precipitation is mixed with the charcoal from the filter-beds. This mixed charcoal layer on the filter-beds I use for the purpose of completely purifying the liquid from the deposit-tank, inasmuch as the charcoal absorbs the still remaining impurities, and thus becomes much richer as a fertilizer. The spent charcoal, after having been used twice in sugar-refineries, is a cheap article, is very porous, and has great absorbing power. When the charcoal has purified the water, then it is mixed with the precipitate from the deposit-tanks, and this mixture forms in itself a very good manure. But to increase the contents of ammonia in this manure I add to it, to the extent of from eight to ten per cent., the impure salt resulting from treating the ammoniacal liquor of gas-works with sulphuric acid and evaporating it to dryness. In this manner I simultaneously defecate sewage-waters and render them innocuous, and produce a manure of considerable commercial value.

Having thus described the nature of my said invention, and the manner of performing the same, I would have it understood that I claim—

1. The treatment of sewage with lime, the chloride of zinc, and the chloride of magnesium, substantially as before set forth, and the subsequent separation of the liquid and solid constituents by deposition and filtration.

2. The treatment of sewage with lime, and, after the deposit of the precipitate, with carbonic acid, previous to filtration, to precipitate any excess of lime, substantially as before set forth.

3. The combination of the deposit-tank and the filter, by means of the self-acting floating outlet, so as to draw off the liquid at or near the surface thereof, substantially as before set forth.

4. The combination of the agitating-chamber with two sets of deposit-tanks and filters, so that one series may be cleansed and got ready for use without the necessity of stopping the flow of sewage, substantially as before set forth.

5. The manufacture of artificial manure by mixing together the chemical precipitate obtained by treating the sewage with the disinfecting materials and the spent filtering materials, and drying the product, substantially as before set forth.

F. HILLÉ.

Witnesses:
  G. F. WARREN,
  WILMER M. HARRIS.
*Both of No. 17 Gracechurch street, London.*